Figure 1:
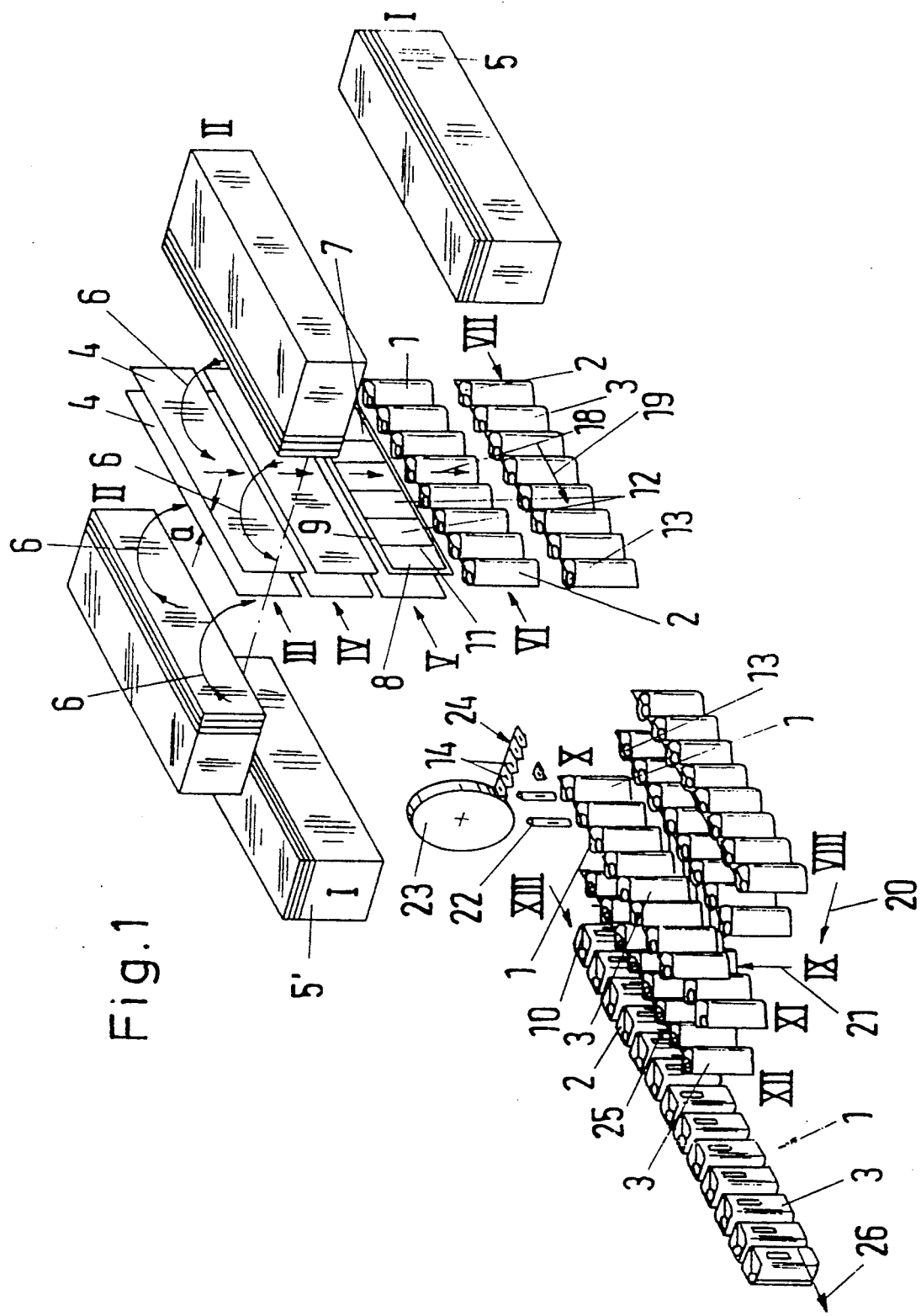

United States Patent [19]

Reil et al.

[11] Patent Number: 5,142,843
[45] Date of Patent: Sep. 1, 1992

[54] METHOD OF MANUFACTURING A PACKAGE FOR FLOWABLE MEDIA AND THE USE OF A SYNTHETIC PLASTICS SHEET FOR THE MANUFACTURING PROCESS

[75] Inventors: Wilhelm Reil, Bensheim; Ulrich Deutschbein, Mühltal; Gerd Knobloch, Griesheim; Udo Liebram, Pfungstadt, all of Fed. Rep. of Germany

[73] Assignee: Tetra Pak Holdings S.A., Pully, Switzerland

[21] Appl. No.: 629,277

[22] Filed: Dec. 18, 1990

[30] Foreign Application Priority Data

Dec. 20, 1989 [DE] Fed. Rep. of Germany ....... 3941992

[51] Int. Cl.$^5$ .................. B65B 3/02; B29C 51/02; B29C 65/72; B29C 69/00
[52] U.S. Cl. ..................... 53/453; 53/410; 53/456
[58] Field of Search .............. 53/410, 423, 453, 554, 53/456, 559, 561, 578

[56] References Cited

U.S. PATENT DOCUMENTS

| | | | |
|---|---|---|---|
| 3,245,197 | 4/1966 | Van Mil, Jr. et al. | 53/453 |
| 3,323,274 | 6/1967 | Justus | 53/453 |
| 3,412,901 | 11/1968 | Izumi | 53/453 X |
| 3,413,131 | 11/1968 | Fritsche | 53/453 |
| 3,548,043 | 12/1970 | Held, Jr. | 264/89 |
| 3,583,036 | 6/1971 | Brown | 18/19 |
| 4,034,536 | 7/1977 | Mahaffy et al. | 53/453 |
| 4,588,090 | 5/1986 | Spuck et al. | 53/453 X |
| 4,631,901 | 12/1986 | Chung et al. | 53/455 |

FOREIGN PATENT DOCUMENTS 3244994 6/1984 Fed. Rep. of Germany .

Primary Examiner—James F. Coan
Attorney, Agent, or Firm—James F. Mudd; Michael L. Dunn

[57] ABSTRACT

A method of manufacturing a package (1) which is filled with a flowable medium and which comprises a tube (3), a bottom and a top wall (2) of shapeable synthetic plastics material in which the package (1) formed by shaping and the action of heat is filled, sealed and carried away is described.

In order to provide an environmentally friendly manufacturing method in which a package can be produced by deep-drawing and without any substantial amount of waste material, it is according to the invention envisaged that two prepared blanks (4), each of which takes the form of a flat sheet, should be heated at a distance from each other (in III-V) and then brought together along a frame-like strip (7 to 11) and, accompanied by (at V) deep-drawing of the middle zone (12) within the frame-like strip (10), welded together to form the package space, an aperture (13) being provided in a top wall (2), the package (1) which is thus formed and which is fluid-tight with the exception of the aperture zone (3) being then cooled, conveyed onwardly (18 to 20), filled (in position XI) and sealed by an opening member (14) which masks the aperture (13).

62 Claims, 3 Drawing Sheets

METHOD OF MANUFACTURING A PACKAGE FOR FLOWABLE MEDIA AND THE USE OF A SYNTHETIC PLASTICS SHEET FOR THE MANUFACTURING PROCESS

The invention relates to a method of manufacturing a package filled with a flowable medium and comprising a tube, bottom and top wall of a shapeable synthetic plastics material in which the package formed by shaping and the action of heat is filled, sealed and carried away.

Manufacturing methods of the type mentioned above are already known in the production of packages in which oily or pasty compositions or fats are packaged. From synthetic plastics materials which can be deep-drawn and which must, of course, be compatible with the contents with which they are to be filled, the package space is formed by the shaping of a tube with a bottom and a top wall or two package halves are shaped and welded to each other in a fluid-tight fashion. In the known methods, the shaping is carried out by deep-drawing and, according to the package being produced, so more or less complicated tools are used and above all there is a not inconsiderable proportion of waste material. In the case of the prior art deep-drawing methods, in fact, a stamping out process is used to produce a framework, also referred to as a grid, for carrying the containers which are to be deep-drawn. After the deep-drawing stage of the production process, this framework has to be withdrawn from the machine and is generally rolled up and fed to another production station to be used again. This not inconsiderable quantity of material must be melted down again so that it can be further processed.

Apart from the disadvantageous use of energy and additional steps involved in recovering the waste material, such removal and carrying away of this material, particularly if it is in the form of a bulky framework or grid, is disadvantageous where the filling machines are concerned, even if one considers only the additional parts of the machine which are needed and the space required to carry away the waste material.

The object on which the invention is based is to provide an environmentally friendly manufacturing process having the features of the above-mentioned type, in which to a certain extent long clock times can be attained and in which simpler production stages are made possible without waste or the need to recycle material.

According to the invention, this problem is resolved in that two prepared blanks in the form of in each case one sheet are heated at a distance from each other, and are then brought together at least along a frame-like strip and, accompanied by a deep-drawing process involving the middle portion, they are welded within the frame-like strip to form the package space, an aperture being provided in an upper wall, the resultant package which is fluid-tight with the exception of the opening area being cooled, carried away, filled and sealed by an opening member which masks the aperture.

In principle, therefore, the invention is based on prepared blanks which are either submitted in correspondingly moving magazines and which are singled out and then made available pairwise and spaced apart during the process or which are taken from a belt and singled out prior to being offered in pairs. It is important to note that in the case of the method of the invention the prepared blanks are completely consumed without any grid-like waste resulting. This is achieved by bringing the pair of related blanks together along a frame-like strip which preferably lies in the peripheral zone of the relevant blank. The outer edge of the relevant prepared blank is therefore used for holding and welding and the intermediate middle zone is used for deep-drawing. It makes no difference in this respect whether a single package is prepared from one pair of prepared blanks or whether a group of packages are produced simultaneously. If a single package is being produced, the frame-like strip extends along the periphery of the prepared blank and in the case of multiple package production, in groups, then in addition to the strip along the periphery of the prepared blank, preferably a group of strips will extend also transversely through the relevant blank. Whatever happens, the relevant pair of prepared blanks will be brought together in the heated state along a frame-like strip and welded in the region of the strip.

If it is intended to produce a generally usable liquids package, it goes without saying that an aperture should be disposed in the top wall. This can be provided in the upper wall during the course of those steps of the invention which are being described here, and preferably in the region of the frame-like strip, as will be described more precisely hereinafter.

The package then formed is welded in fluid-tight manner and would be completely fluid-tight if the aperture were not provided. To complete the manufacturing process, finally, and after the package has been filled, the aperture is sealed by a welded-in opening member.

The aforedescribed measures according to the invention make it possible to provide a particularly environmentally friendly method because this method does not generate any waste material and in particular there is no grid-like framework left after the appropriate blanks for the packages have been stamped out. Instead, the stamping out process is eliminated and the periphery of the relevant prepared blank is used as a sealing strip. Thus, the creation of waste material and recycling of the corresponding material become completely superfluous, with all the advantages which this entails both during manufacture of the package and also during filling thereof. The use of substantially flat sheets as prepared blanks and also the other stages in the method permit of particularly simple manufacture which—as will be shown hereinafter— can in some cases lead to long clock times. Linked with this are the advantages of processing which is favourable in many respects because if there is sufficient time available for individual stages in the procedure, then these steps in the procedure can be kept very simple. Within a long clock time, for example, filling by force of gravity is possible without the medium flow velocity having to be increased by raising the pressure of the media.

Furthermore, it is according to the invention advantageous of the two prepared blanks provided for forming at least one package are heated by being brought into contact with heat from heating jaws in at least two stages, each prepared blank being held by a vacuum on the frame of a shaping jaw along its outer edge, to form the frame-like strip and being further heated, after which the strips of the two prepared blanks are moved towards each other and upon a deep-drawing of the middle portion of the package they are connected to each other by contact welding. According to the concrete teaching of the invention, heating of the prepared blanks takes place very conveniently by physical contact with heated jaws, heating to the necessary temperature best being sub-divided into two stages because then the manufacturing process can be better adapted to a continuous operation. If the sheet-like blanks have been preheated to a predetermined softness by passing through the two stages, then they are only brought in contact with a correspondingly shaped surface of a moulding jaw in the region of the frame-like strip and are attracted to the surfaces thereof by a vacuum and are held fast and then, when the moulding tools have been correspondingly heated—at least in the middle zone within the frame-like strip—and after the frame-like strips have been pressed against each other and sealed to each other, a deep-drawing process takes place in the region between them, because the two sheet-like blanks are only supported along the frame and can therefore only be deep-drawn in the areas between the frame-like strips. One package part which has been produced from one prepared blank of the pair is then brought into contact with the other package part along the frame-like strip, the heated strip-like surfaces of the moulding tools exerting on each side of an imaginary central plane and from the reverse side pressure to the strip of the package part so that the strips of the two package parts are connected to each other in an inseparable manner.

According to the invention, it is furthermore expedient if the aperture in the top wall of the package is formed during the deep-drawing process in that instead of the strip a recess forming a half of the aperture is formed in the relevant top wall part by deep-drawing, the two recesses forming the aperture when the strips are welded together. It has already been mentioned above that it is necessary to form in the top wall of the package an aperture so that after its essential parts have been manufactured, the package can be filled. It is expedient if, according to the teaching of the invention, this aperture is produced during the deep-drawing process, the opening preferably being disposed in the region of the frame-like strip so that in the relevant package part (because two package parts are welded together and then form the entire package), a recess can be so formed by deep-drawing that when the package parts are placed together after the deep-drawing process, both recesses together form the said aperture. It will be easily understood therefore that after the aforementioned frame-like strips of the two package parts have been pressed against each other to form the package space between them, the total package can indeed be welded closed in fluid-tight fashion and is welded by a combination of heat and pressure, certainly with the exception of the opening area because the two recesses form an aperture which remains open until after the filling operation.

According to the invention, it is furthermore particularly advantageous if the package walls are moulded to such a shape that the frame-like strip lies substantially in one plane and completely encircles the package with the exception of the aperture and does not project beyond the outer contours of the package, at least at the bottom and the top wall. The deep-drawing moulds can be constructed accordingly and then, despite the strip which braces the package and which is, at least in the region of the bottom and top walls, so to speak disposed at right-angles to their planes, the strip does not extend outside the overall or peripheral contours of the package. In other words, a package which is manufactured in this way will stand securely and such packages can also be stacked on top of one another. Nevertheless, this package is advantageously stiffened by the frame-like strip because only with the exception of the aperture for the pouring device the strip completely encircles the package without projecting beyond its outer contours.

According to a preferred measure according to the invention, upon deep-drawing, a channel-like depression is moulded into at least one package wall and accommodates the frame-like strip. If the strip in question traverses for example the flat top wall longitudinally, transversely or diagonally, then the channel-like depression which can also be cut out as a groove, serves to accommodate this strip so that in the final analysis, the strip does not project beyond the outer contours of the package and thus does not project beyond the outer flat surface of the top wall. Disposing this depression in accordance with the invention is not naturally confined to a flat top wall because a depression can also traverse a conical or otherwise curved surface along a specific line, this channel-like depression or groove following the strip as it extends around the surface of the package.

Furthermore, the invention is advantageously developed in that a separately pre-fabricated openable opening member of shapeable synthetic plastics material is brought to the filled package, is heated during simultaneous heating of the edge of the aperture and is then inserted into the aperture and welded to the edge thereof in fluid-tight manner. The foregoing remarks evidently describe the formation of the package with the aperture as yet unsealed and it has already been described how the contents can be subsequently filled into the package. Indeed, it goes without saying that the package must then be sealed but mentioned hereinabove are the advantageous measures in the case of a third embodiment, whereby this sealing is performed by bringing in, fitting and welding a so-called opening member. This may be separately pre-fabricated from a suitably mouldable synthetic plastics material and may be so shaped that even after it has been welded into the said aperture in the top wall of the package, it can still be opened. Only then is it an expedient pouring device because such a device must be perfectly fluid-tight and yet be capable of being opened without the application of excessive force. As far as possible, it should also permit of re-closure which is according to the invention readily guaranteed. By reason of the separate manufacture of the opening member, so according to the construction of the magazine, the desired number of opening members will be available at any given time and it is then only necessary for them to be brough to the package and in fact to the aperture thereof by appropriate measures. With a correspondingly preheated edge and a corresponding mating surface on the opening member, it is then sufficient to press the opening member onto and into the edge of the package aperture so that preferably by the additional application of a small pressing movement, a fluid-tight weld is guaranteed.

To improve the efficiency of the manufacturing method or of the machine provided for carrying out this method, it is advantageous if according to the invention, for the simultaneous shaping of a plurality of packages, a corresponding number of frame-like strips are formed in the marginal zone and in the intermediate strip zones of the relevant prepared blank during the deep-drawing stage, the deep-drawn middle zones between the strips forming in each case one row of serially disposed package halves, all the strip zones of two prepared blanks in one pair being welded to one another simultaneously and after the row of packages has been filled and closed by sealing on a corresponding row of opening members, the row of packages is preferably sub-divided into individual packages, preferably by a parting welding process.

In conjunction with the frame-like strip and the corresponding surface of the moulding tool, it has already been stated that indeed such a strip should be formed at the edge of the prepared blank and during manufacture of a group of packages at the same time and from in each case a pair of prepared blanks, also intermediate strips should be provided. The sheet-like prepared blank may, for example, take the form of a rectangle, the height of the blank corresponding to the height of the completed package and the length of the blank corresponding to the maximum width of a row or group of serially disposed packages if, for example, the double-walled middle strip of the completed package composed, for instance, of two frame-like strips extending diagonally through it in the region of the bottom and the top wall. The entire blank then forms the rectangular frame-like strip in the form of a right-angle of the said height and of the described length, further rectilinear strips extending parallel with and at a distance from one another over the height so that the entire blank is sub-divided into the corresponding number of partial fields corresponding to the number of packages which it is intended to produce from this one blank. With a correspondingly broad configuration of the intermediate strips, these can be so sub-divided during the singling-out process-preferably by parting welding, that each package also acquires the desired double-walled middle strip over its entire height.

It will be understood that the method of manufacture involving the simultaneous shaping of a plurality of packages can be substantially accelerated-preferably to the benefit of certain machining stages which can then enjoy a long clock time.

According to the invention, it is expedient for the prepared blanks to be heated to 160° C. up to about 200° C. and preferably 170° C. to 180° C., each stage taking about three seconds to five seconds and preferably two to three seconds. In this way, the prepared blanks are brought to the correct degree of softness, particularly with two or three stage heating of the substantially flat blanks, so that then in a really short time the frame-like surfaces of the moulding tool can grip the relevant package by the frame-like strip, attracting it by negative pressure and, accompanied by further heating, so press it against the correspondingly frame-like strip of the mating member of a pair that one total package is formed from the two half parts. It is true that this method is not limited to exactly one half of the end product being formed on each side of the aforesaid imaginary central plane but it will be evident that this is particularly practical and therefore also preferred according to the invention.

During the processing of the sheet-like blanks by the method according to the invention, it is advantageous if the pairs of sheet-like blanks are conveyed through the individual stages of the process by force of gravity or by compressed air/suction air drives. When the blanks of a respective pair are preheated by contact with heat in one first stage and in at least one second subsequent stage, conveyance from one heating stage to the next is best effected by keeping the blanks in a suitable arrangement and allowing them to fall onto bearing surfaces disposed vertically below (force of gravity) or by bringing them to heating jaws by suction air and holding them such that the jaws can move with, or relative to, the blank, wherein the possibility to change over to compressed air is expedient, particularly to increase the separation speeds.

According to the invention it has been shown to be very advantageous if for manufacture of a liquids package use is made of a plastics sheet 0.2 to 1.7 mm, preferably 0.4 to 1.0 mm in thickness for the blank which consists of a preferably filled, deep-drawable thermoplast. Plastics materials which are shapeable by the cold or by heat are known, and all of them are suitable for manufacturing a package with the process of the invention. Preferably, the plastics material of the package is deep-drawable, in particular a thermoplastic plastics material, such as polypropene, for example. The thermoplastic plastics materials used can, for example, also be PVC, and polypropene is also widely known in the art as polypropylene. When a material of this kind is used for the blank, the package manufactured with the process according to the invention consists of parts and materials which are able to be reused satisfactorily (as opposed to compound materials). With a preferred embodiment, the plastics material e.g. polypropene can also be filled, the fillers used being chalk, mica, talcum, gypsum or the like. In practice, degrees of filling of some 60% have been found to be favourable. It has been shown that synthetic plastics materials which have been filled in this way, and in particular the aforementioned synthetic plastics sheets when used as blanks, can be deep-drawn and also sealed.

Figure 2:
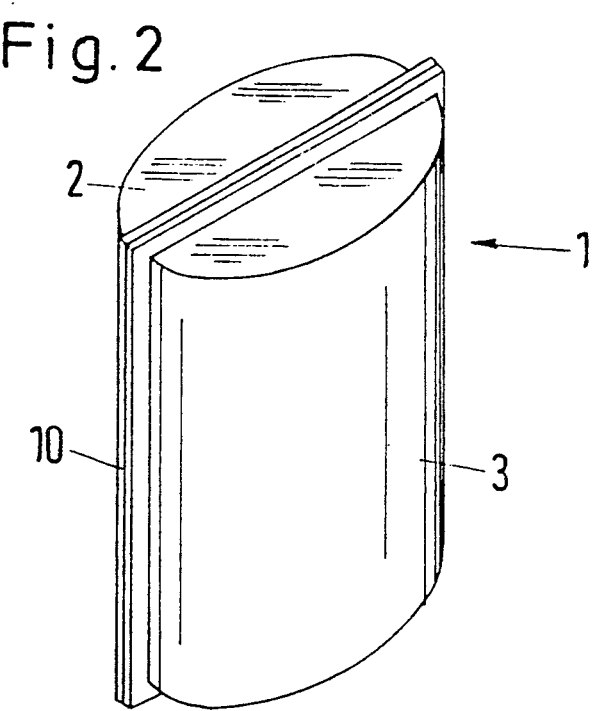
Figure 3:
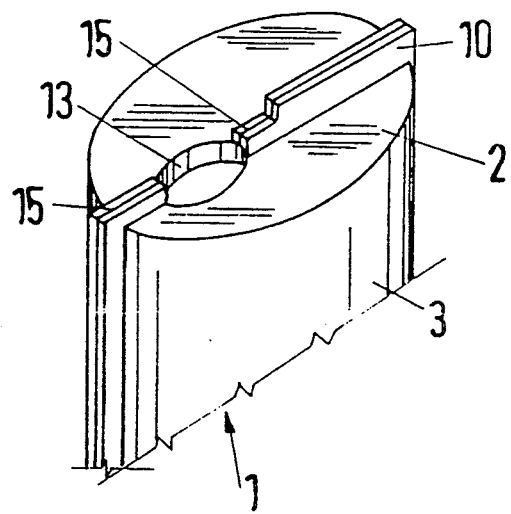
Figure 4:
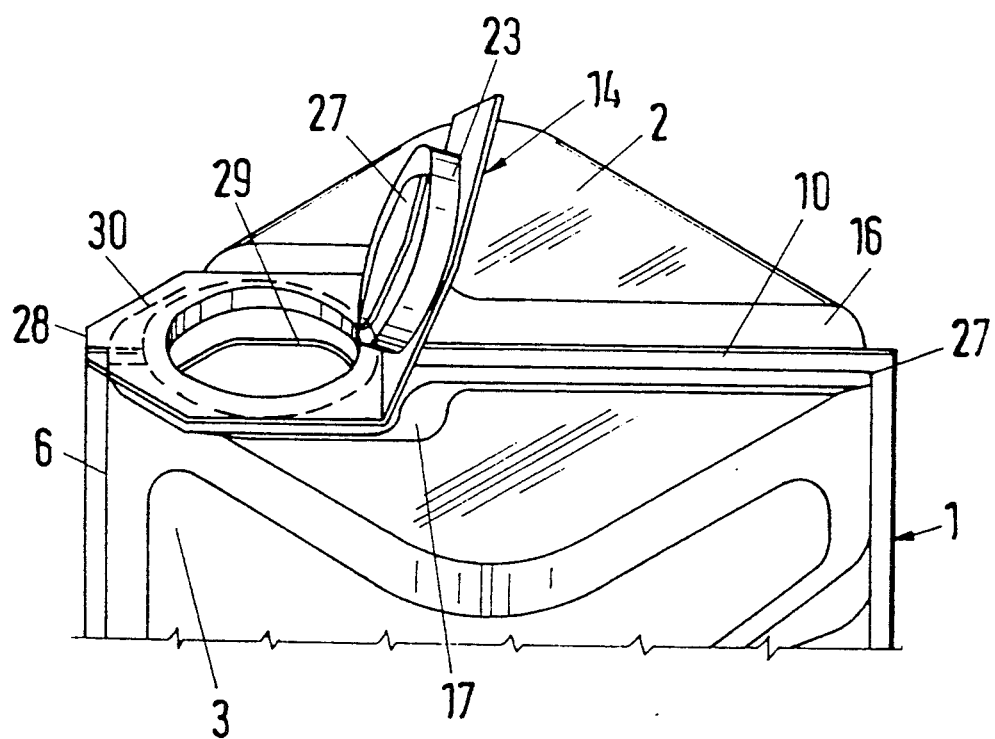

Further advantages, features and possible applications of the present invention will emerge from the ensuing description of preferred examples of embodiment, in conjunction with the accompanying drawings, in which:

FIG. 1 is a perspective view of the individual steps in the method of manufacturing a fluids package;

FIG. 2 diagrammatically shows an imaginary intermediate product in order to illustrate the basic steps in the manufacturing method;

FIG. 3 diagrammatically shows the top wall such as is formed in the case of a particular embodiment and prior to filling, and FIG. 4 is a perspective view of the enlarged top of the package shown in FIG. 1, as the product of the manufacturing method.

The package generally designated 1 comprises, not shown in greater detail in the drawings, a bottom and a substantially flat top wall 2, the main body or the package space being formed by a tube 3 disposed between the bottom and the top wall 2. All parts, i.e. the bottom, the top wall 2 and the tube 3, in other words the entire package 1, consists of 60% chalk-filled polypropene which is readily shapeable and deep-drawable.

This synthetic plastics material is delivered in the form of two substantially plane prepared blanks 4 in sheet form. On two sides of an easily imagined vertical central plane which is not described in greater detail there is on the right in FIG. 1 a first stack 5 and on the left, outside, a corresponding second stack 5' of these blanks 4 shown in each case in a position I. It may be advantageous for the blanks 4 to be stacked on one another substantially horizontally as is shown for forming the stack 5, 5' in the position I. But also any other disposition of the blanks 4 in the form of the flat sheets is conceivable such as is, in fact, shown in the position II which is illustrated above, in which the stack 5, 5' has been so rotated through 90° that the relevant sheet plane of the blanks 4 is substantially vertical. The blanks 4 are therefore fed to the manufacturing process in this position II. The blanks 4 may already be printed.

The manufacturing process starts in that whichever is the foremost blank 4 from the stack 5, 5' is moved into the position III in which this pair of blanks 4 naturally consists of two individual flat and rectangular blanks 4 which are held apart at a distance a from each other.

In so far as the blanks 4 of each pair are treated identically in the individual stages, the ensuing description will be confined to representing and explaining the treatment and movement of the front right-hand sheet.

The first movement of the blank 4 (of both blanks 4 of a pair) therefore took place according to the curved arrow 6, so that the vertical blank 4 was moved out of position II into position III. In this position, heat contact with heating tools, not shown, for about three seconds' duration produced a heating with a heating tool temperature of about 170° C.

After this time and heating, the blank 4 was moved vertically downwardly into position IV which may be described as the second heating stage. Here, heating of the relevant blank 4 was repeated for three seconds in heating contact with a heating tool at about 170° C. and preferably on both sides between heating tools which were pressed against each other.

A third heating stage followed in that the blank 4 was again moved vertically downwardly into position V where it was stopped and heated for another three seconds. After position V, either removal of the package halves from the mould was commenced or removal from the mould was started after the blank 4 left stage IV and arrived at stage V.

In position V, therefore, there is shown on the front blank the frame-like strip such as is created by correspondingly shaped surfaces of the moulding tool, not shown. Extending in a clockwise direction from the bottom upwardly, the viewer of the front right-hand blank 4 in position V can see the horizontal straight part 7 and then on the left the part 8 which extends vertically upwardly over the total height of the blank 4 and finally the again horizontally extending part 9 of the frame-like strip which is generally designated 10. In position V, the right-hand vertical part of the frame-like strip 10 is concealed and cannot therefore be seen.

In the case of the embodiment shown in FIG. 1, it is not a single package which is being produced from a pair of blanks 4 but by reason of the elongate rectangular form of the relevant blank 4, a whole row of in this case eight packages is being produced from a single pair of blanks 4. Consequently, between the front visible vertical part 8 of the strip 10 and the rear invisible vertical part 7 there are broader and straight intermediate parts 11 resulting in an entire row of eight frame-like strips 10, one each for each package such as is shown in position VI underneath it.

Within the relevant frame-like strip 10 and in the entire blank 4 there is in each case a middle zone 12 which in the case of the embodiment in which the whole-area preheating is completed in position IV, is in position V deep-drawn to form the actual tube 3 of the package 1.

Looking, therefore, at this embodiment in which in position V the entire blank 4 is drawn by suction to a correspondingly shaped but not shown moulding tool by a vacuum along the relevant strip 10, it will be understood that nevertheless there is a further heating of at least the strip 10 and after the vacuum has been switched on, the middle zone 12 is deep-drawn in the moulding tool.

Not shown is the formation of the aperture 13 in the top wall 2 of the package 1. If the formation of this aperture 13 were to be disregarded, then after the blanks 4 of a pair were brought together along their frame-like strip 10 and after they had been welded to each other, a package 1 according to FIG. 2 would be formed (subject to the condition of a, for example, circular top wall 2). This embodiment in FIG. 2 is chosen solely for understanding of the steps of the method and for simpler illustration.

In actual fact, according to the teaching of the invention, the aperture must be formed during the deep-drawing stage, so that in the case of a circular top wall 2, a package top according to the broken away view in FIG. 3 is created, For reasons of better accommodation of the opening member 14, the double walled strip 10 of the package according to FIG. 3 should be even compressed alongside the aperture 13 in the regions 15, i.e. it should project upwardly from the surface of the top wall 2 by a lesser height than the actual strip 10. By providing corresponding depressions 16 such as are shown, for example, in the top wall 2 in the case of the embodiment shown in FIG. 4 (with a widening 17 in the front zone), all the parts of the package including the frame-like strip 10 and the opening member, can be accommodated within the outer contours of the package.

Where the method is concerned, therefore, and having regard now to the formation of the aperture 13, a row of packages 1 can be removed from the mould in accordance with the position VI. Therefore, eight interconnected and directly serially disposed packages 1 are present in the position VI, once they have been moved vertically downwardly in the direction of the arrow 18 out of position V between the (not shown) moulding tools and into position VI. Successive packages 1 are connected to one another by the broad straight intermediate strip parts 11.

After a certain cooling time and movement into position VII (for the last time vertically in the direction of the arrow 18), the row of eight packages 1 can be moved in the direction of the horizontal arrow 19 and in the case of the embodiment in FIG. 1 they can then be moved at a right-angle leftwardly and to the rear according to arrow 20 into the position VIII. There, the row of packages can be left to rest, cool and harden out.

Possibly after onwards conveyance in a horizontal direction according to the arrow 20 another rest position might be interposed at position 9. However, the row of packages can also be moved out of position IX vertically upwardly into position X as indicated by the vertical arrow 21 so that they can be filled by eight fillers, of which only two are shown diagrammatically and identified by reference numeral 22. The relevant package is therefore moved to the filler pipe and as the filling level rises, it is lowered again in a direction opposite to that indicated by the vertical arrow 21. The row of packages is then passed on into position XI in the direction of the arrow 20. There is still one package substantially in the condition shown in FIG. 3, i.e. the aperture 13 is still unsealed.

For fluid-tight welding, then, a separate pre-fabricated opening member mounted on a roller 23 is brought forward in the form of a chain and separated at 24. The relevant separated opening member 14 is then positioned at an appropriate distance from the next leading or subsequent one of the eight packages 1, in position XI, means not shown then heat the downwardly facing surface of the opening member and at the same time in the case of the embodiment of package shown in FIG. 3 they heat the edge of the aperture 13 and afterwards the heated parts are brought together in that the opening member 14 is inserted downwardly into and is pressed against the aperture 13. Thus, the opening member 14 is welded to the edge of the aperture 13 in a fluid-tight manner. This condition of the completely sealed package is illustrated in position XI with reference to the foremost two packages.

If the still interconnected unit of eight packages 1 is moved onwards in the direction of the arrow 20 into the position XII, then the row of packages is now disposed alongside a diagrammatically indicated parting welding device 25 which shows seven equidistantly disposed and parallel extending parting welding wires. These travel into the intermediate strip parts 11 and halve them so that each of the adjacent packages has a fluid-tight vertically extending longitudinal strip 10.

The packages 1 which are separated in this way are conveyed onwardly in the direction of the arrow 20 and into the position XIII being rotated through 90° in the process, because in this position further conveyance of the package can be better influenced and is more favourable also for further processing, particularly for repackaging. The packages are then removed in the direction of the arrow 26 shown on the left at the front.

It is possible by the manufacturing process described to produce a liquids package 1 the tube 3 of which is cross-sectionally rectangular (particularly square) and which has rounded corners so that the outer edges of the respective frame-like strip 10 are positioned in the geometrically exact corner edges. The vertical longitudinal parts 8, 11 of the relevant strip 10 of a package 1 are therefore situated in the corner zone of two wall planes of the tube 3 which are preferably disposed at 90° in respect of each other so that the cross-sectionally rectangular package is not halved parallel with one side wall of the tube 3 but is halved along the diagonal. In plan view of the cross-sectionally rectangular package according to the embodiment in FIG. 4, therefore, the upper horizontal strip part 9 of the frame-like strip 10 passes diagonally through the top wall 2, i.e. from a socalled rear corner 27 forwards to the pouring edge 28 of the opening member 14 which is shown in the opened position. FIG. 4 also shows the edge of the pourer orifice 29.

The opening member 14 and the horizontal part 9 of the strip 10 are disposed in the top wall 2, in the depressions 16 and 17, so that there is no part which extends beyond the outer contours, i.e. the plane of the top wall 2.

Also in the region of the bottom there is, accommodating the frame-like strip 10, a channel-like depression such as was described with reference to the top wall 2, except that in the bottom zone there is no need to provide a widened depression 17 because no aperture 13 nor any opening member 14 have to be accommodated therein.

In FIG. 1, manufacture is only illustrated with effect from the position VIII and on one side with a displacement in the direction of the horizontal arrow 20. It is however possible to imagine that in order to increase the output from the manufacturing process, filling, sealing, singling out and removal can also take place in the other direction, in a substantially mirrored-symmetrical manner if, for example, every second group of eight packages 1 were to be displaced forwards and to the right in the direction of a horizontal arrow pointing in the opposite direction to the arrow 20. Then, too, a second roll 23 would have to be provided, together with the strip of opening members 14.

What is claimed is:

1. A method of manufacturing a package which is filled with a flowable medium and composed of a tube and top and bottom walls constructed of a shapeable synthetic plastic material, comprising the steps of:
   a) heating two prepared blanks, which are in the form of sheets, at a distance from each other by bringing said blanks into contact with heating jaws in at least two stages;
   b) deep-drawing the middle portion of the heated prepared blanks;
   c) welding said heated blanks within a frame-like strip to form a package space having an aperture in an upper wall;
   d) cooling the resultant package which is fluid-tight with the exception of said aperture in an upper wall;
   e) carrying away the cooled package;
   f) filling said cooled package with flowable medium; and
   g) sealing said package by masking said aperture with an opening member;
   wherein the sheets of blanks are first cut in such a way that the outer edges lie within the outer contours of the heating jaws, and wherein at least at the bottom and the top wall, the framelike strip does not project beyond the outer contours of the package, and wherein the heat for the deep-drawing step at least partially results from the heating stages.

2. A method according to claim 1 comprising:
   a) heating said prepared blanks which form at least one package by being brought into contact with heating jaws in at least two stages;
   b) holding each prepared blank by vacuum on the frame of a shaping jaw along its outer edge, to form the frame-like strip;
   c) further heating the package after which the strips of said prepared blanks are moved toward each other,
   d) deep-drawing the middle portion of the heated prepared blanks, and
   e) connecting said strips to each other by contact welding.

3. A method according to claim 1 comprising forming the aperture in the top wall of the package during the deep-drawing process in that instead of the strip, a recess which forms a half of the aperture is formed in the relevant top wall part by deep drawing, wherein the two recesses form the aperture when the strips are welded together.

4. A method according to claim 2 comprising forming the aperture in the top wall of the package during the deep-drawing process in that instead of the strip, a recess which forms a half of the aperture is formed in the relevant top wall part by deep drawing, wherein the two recesses form the aperture when the strips are welded together.

5. A method according to claim 1 comprising shaping the package walls to such a form that the frame-like strip lies substantially in one plane and completely encircles the package with the exception of the aperture, while at least at the bottom and the top wall the framelike strip does not project beyond the outer contours of the package.

6. A method according to claim 2 comprising shaping the package walls to such a form that the frame-like strip lies substantially in one plane and completely encircles the package with the exception of the aperture, while at least at the bottom and the top wall the frame-like strip does not project beyond the outer contours of the package.

7. A method according to claim 3, comprising shaping the package walls to such a form that the frame-like strip lies substantially in one plane and completely encircles the package with the exception of the aperture, while at least at the bottom and the top wall the frame-like strip does not project beyond the outer contours of the package.

8. A method according to claim 1 which comprises forming during the deep-drawing step, a channel-like depression which accommodates the frame-like strip in at least one wall of the package.

9. A method according to claim 2 which comprises forming during the deep-drawing step, a channel-like depression which accommodates the frame-like strip in at least one wall of the package.

10. A method according to claim 3 which comprises forming during the deep-drawing step, a channel-like depression which accommodates the frame-like strip in at least one wall of the package.

11. A method according to claim 4 which comprises forming during the deep-drawing step, a channel-like depression which accommodates the frame-like strip in at least one wall of the package.

12. A method according to claim 1 which comprises:
a) bringing a separately prefabricated openable opening member of deformable synthetic plastic material to the filled package;
b) heating said opening member during simultaneous heating of the edge of the aperture;
c) inserting said opening member into the aperture; and d) welding said opening member to the edge thereof in a fluid tight manner.

13. A method according to claim 2 which comprises:
a) bringing a separately prefabricated openable opening member of deformable synthetic plastic material to the filled package;
b) heating said opening member during simultaneous heating of the edge of the aperture;
c) inserting said opening member into the aperture; and
d) welding said opening member to the edge thereof in fluid tight manner.

14. A method according to claim 3 which comprises:
a) bringing a separately prefabricated openable opening member of deformable synthetic plastic material to the filled package;
b) heating said opening member during simultaneous heating of the edge of the aperture;
c) inserting said opening member into the aperture; and
d) welding said opening member to the edge thereof in a fluid tight manner.

15. A method according to claim 4 which comprises:
a) bringing a separately prefabricated openable opening member of deformable synthetic plastic material to the filled package;
b) heating said opening member during simultaneous heating of the edge of the aperture;
c) inserting said opening member into the aperture; and
d) welding said opening member to the edge thereof in a fluid tight manner.

16. A method according to claim 5 which comprises:
a) bringing a separately prefabricated openable opening member of deformable synthetic plastic material to the filled package;
b) heating said opening member during simultaneous heating of the edge of the aperture;
c) inserting said opening member into the aperture; and
d) welding said opening member to the edge thereof in a fluid tight manner.

17. A method according to claim 1 for the simultaneous shaping of a plurality of packages, comprising:
a) forming a corresponding number of frame-like strips in the marginal zone and in the intermediate strip zones of the relevant prepared blank during the deep drawing step, and wherein the middle zones which are deep-drawn between the strips, form in each case a series of serially disposed package halves;
b) welding all the strip zones of two prepared blanks of one pair simultaneously to each other;
c) filling the row of packages;
d) closing by sealing on a corresponding row of opening members; and
e) separating the row of packages into individual packages by a parting device.

18. A method according to claim 2 for the simultaneous shaping of a plurality of packages, comprising:
a) forming a corresponding number of frame-like strips in the marginal zone and in the intermediate strip zones of the relevant prepared blank during the deep drawing step, and wherein the middle zones which are deep-drawn between the strips, form in each case a series of serially disposed package halves;
b) welding all the strip zones of two prepared blanks of one pair simultanteously to each other;
c) filling the row of packages;
d) closing by sealing on a corresponding row of opening members; and
e) separating the row of packages into individual packages by a parting device.

19. A method according to claim 3 for the simultaneous shaping of a plurality of packages, comprising:
a) forming a corresponding number of frame-like strips in the marginal zone and in the intermediate strip zones of the relevant prepared blank during the deep drawing step, and wherein the middle zones which are deep-drawn between the strips, form in each case a series of serially disposed package halves;
b) welding all the strip zones of two prepared blanks of one pair simultanteously to each other;
c) filling the row of packages;
d) closing by sealing on a corresponding row of opening members; and
e) separating the row of packages into individual packages by a parting device.

20. A method according to claim 4 for the simultaneous shaping of a plurality of packages, comprising:
a) forming a corresponding number of frame-like strips in the marginal zone and in the intermediate strip zones of the relevant prepared blank during the deep drawing step, and wherein the middle zones which are deep-drawn between the strips, form in each case a series of serially disposed package halves;

b) welding all the strip zones of two prepared blanks of one pair simultaneously to each other;

c) filling the row of packages;

d) closing by sealing on a corresponding row of opening members; and e) separating the row of packages into individual packages by a parting device.

21. A method according to claim 5 for the simultaneous shaping of a plurality of packages, comprising:

a) forming a corresponding number of frame-like strips in the marginal zone and in the intermediate strip zones of the relevant prepared blank during the deep drawing step, and wherein the middle zones which are deep-drawn between the strips, form in each case a series of serially disposed package halves;

b) welding all the strip zones of two prepared blanks of one pair simultaneously to each other;

c) filling the row of packages;

d) closing by sealing on a corresponding row of opening members; and e) separating the row of packages into individual packages by a parting device.

22. A method according to claim 6 for the simultaneous shaping of a plurality of packages, comprising:

a) forming a corresponding number of frame-like strips in the marginal zone and in the intermediate strip zones of the relevant perpared blank during the deep drawing step, and wherein th middle zones which are deep-drawn between the strips form in each case a series of serially disposed package halves;

b) welding all the strip zones of two prepared blanks of one pair simultaneously to each other;

c) filling the row of packages;

d) closing by sealing on a corresponding row of opening members; and e) separating the row of packages into individual packages by a parting device.

23. A method according to claim 1, characterized in that heating of the prepared blanks to 160° C. to about 200° C. takes place, each stage lasting about three seconds to five seconds.

24. A method according to claim 2, characterized in that heating of the prepared blanks (4) to 160° C. about 200° C. takes place, each stage lasting about three seconds to five seconds.

25. A method according to claim 3, characterized in that heating of the preparedd blanks to 160° C. to about 200° C. takes place, each stage lasting about three seconds to five seconds.

26. A method according to claim 4, characterized in that heating of the prepared blanks to 160° C. to about 200° C. takes place, each stage lasting about three seconds to five seconds.

27. A method according to claim 5, characterized in that heating of the prepared blanks to 160° C. to about 200° C. takes place, each stage lasting about three seconds to five seconds.

28. A method according to claim 6, characterized in that heating of the prepared blanks to 160° C. to about 200° C. takes place, each stage lasting about two to three seconds.

29. A method according to claim 7, characterized in that heating of the prepared blanks to 160° C. to about 200° C. takes place, each stage lasting about two to three seconds.

30. A method according to claim 1, which comprises conveying the pairs of sheet-like prepared blanks through the individual steps of the process by the force of gravity.

31. A method according to claim 2, which comprises conveying the pairs of sheet-like prepared blanks through the individual steps of the process by the force of gravity.

32. A method according to claim 3, which comprises conveying the pairs of sheet-like prepared blanks through the individual steps of the process by the force of gravity.

33. A method according to claim 4, whcih comprises conveying the pairs of sheet-like prepared blanks through the individual steps of the process by the force of gravity.

34. A method according to claim 5, which comprises conveying the pairs of sheet-like prepared blanks through the individual steps of the process by the force of gravity.

35. A method according to claim 6, which comprises conveying the pairs of sheet-like prepared blanks through the individual steps of the process by the force of gravity.

36. A method according to claim 7, which comprises conveying the pairs of sheet-like prepared blanks through the individual steps of the process by the force of gravity.

37. A method according to claim 8, which comprises conveying the pairs of sheet-like prepared blanks through the individual step of the process by the force of gravity.

38. A method according to claim 1, which comprises conveying the pairs of sheet-like prepared blanks through the individual steps of the process by means of compressed air drives.

39. A method according to claim 2, which comprises conveying the pairs of sheet-like prepared blanks through the individual steps of the process by means of compressed air drives.

40. A method according to claim 3, which comprises conveying the pairs of sheet-like prepared blanks throughs the individual steps of the process by means of compressed air drives.

41. A method accroding to claim 4, which comprises conveying the pairs of sheet-like prepared blanks through the individual steps of the process by means of compressed air drives.

42. A method according to claim 5, which comprises conveying the pairs of sheet-like prepared blanks through the individual steps of the process by means of compressed air drives.

43. A method according to claim 6, which comprises conveying the pairs of sheet-like prepared blanks through the individual steps of the process by means of compressed air drives.

44. A method according to claim 7, which comprises conveying the pairs of sheet-like prepared blanks through the individual steps of the process by means of compressed air drives.

45. A method according to claim 8, which comprises conveying the pairs of sheet-like prepared blanks through the individual steps of the process by means of compressed air drives.

46. A method according to claim 1, which comprises conveying the pairs of sheet-like prepared blanks through the individual steps of the process by means of suction air drives.

47. A method according to claim 2, which comprises conveying the pairs of sheet-like prepared blanks through the individual steps of the process by means of suction air drives.

48. A method according to claim 3, which comprises conveying the pairs of sheet-like prepared blanks through the individual steps of the process by means of suction air drives.

49. A method according to claim 4, which comprises conveying the pairs of sheet-like prepared blanks trough the individual steps of the process by means of suction air drives.

50. A method according to claim 5, which comprises conveying the pairs of sheet-like prepared blanks through the individual steps of the process by means of suction air drives.

51. A method according to claim 6, which comprises conveying the pairs of sheet-like prepared blanks through the individual steps of the process by means of suction air drives.

52. A method according to claim 7, which comprises conveying the pairs of sheet-like prepared blanks through the individual steps of the process by means of suction air drives.

53. A method according to claim 8, which comprises conveying the pairs of sheet-like prepared blanks through the individual steps of the process by means of suction air drives.

54. A method according to claim 1, which employs a 0.2 to 1.7 mm thick synthetic plastics sheet as a prepared blank of a thermoplastics material for the manufacture of a package to hold flowable media.

55. A method according to claim 2, which employs a 0.2 to 1.7 mm thick synthetic plastics sheet as a prepared blank of a thermoplastics material for the manufacture of a package to hold flowable media.

56. A method according to claim 3, which employs a 0.2 to 1.7 mm thick synthetic plastics sheet as a prepared blank of a deep-drawable thermoplastics material for the manufacture of a package to hold flowable media.

57. A method according to claim 4, which employs a 0.2 to 1.7 mm thick synthetic plastics sheet as a prepared blank of a deep-drawable thermoplastics material for the manufacture of a package to hold flowable media.

58. A method according to claim 5, which employs a 0.2 to 1.7 mm thick synthetic plastics sheet as a prepared blank of a deep-drawable thermoplastics material for the manufacture of a package to hold flowable media.

59. A method according to claim 6, which employs a 0.2 to 1.7 mm thick synthetic plastics sheet as a prepared blank of a deep-drawable thermoplastics material for the manufacture of a package to hold flowable media.

60. A method according to claim 7, which employs a 0.2 to 1.7 mm thick synthetic plastics sheet as a prepared blank of a deep-drawable thermoplastics material for the manufacture of a package to hold flowable media.

61. A method according to claim 8, which employs a 0.2 to 1.7 mm thick synthetic plastics sheet as a prepared blank of a filled and deep-drawable thermoplastics material for the manufacture of a package to hold flowable media.

62. A method according to claim 9, whichh employs a 0.2 to 1.7 mm thick synthetic plastics sheet as a prepared blank of a filled and deep-drawable thermoplastics material for the manufacture of a package to hold flowable media.

* * * * *